(12) United States Patent
Lee et al.

(10) Patent No.: US 9,590,701 B2
(45) Date of Patent: Mar. 7, 2017

(54) FEEDBACK-BASED ADAPTIVE LOAD MODULATION (ALM) FOR A NEAR FIELD COMMUNICATION (NFC) DEVICE

(71) Applicant: Broadcom Corporation, Irvine, CA (US)

(72) Inventors: Dong-U Lee, Irvine, CA (US); Divyanshu Jain, Cost Mesa, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/809,855

(22) Filed: Jul. 27, 2015

(65) Prior Publication Data
US 2016/0072556 A1  Mar. 10, 2016

Related U.S. Application Data

(60) Provisional application No. 62/047,527, filed on Sep. 8, 2014.

(51) Int. Cl.
*H04B 5/00* (2006.01)

(52) U.S. Cl.
CPC ......... *H04B 5/0075* (2013.01); *H04B 5/0031* (2013.01)

(58) Field of Classification Search
CPC ...... H04B 5/0075; H04B 5/0031; H04B 5/02; H04M 1/7253
USPC ................................. 455/41.1, 41.2
See application file for complete search history.

(56) References Cited

U.S. PATENT DOCUMENTS

| | | | | |
|---|---|---|---|---|
| 3,868,548 A * | 2/1975 | Grundy | .................. | G01P 1/103 105/61 |
| 5,824,022 A * | 10/1998 | Zilberman | ......... | A61N 1/36032 128/903 |
| 7,113,874 B2 * | 9/2006 | Watson | ............... | B60R 21/0136 324/207.13 |
| 7,224,808 B2 * | 5/2007 | Spencer | ................. | G10K 15/02 367/137 |
| 7,463,987 B2 * | 12/2008 | Cech | ................... | B60R 21/0136 280/734 |
| 7,864,070 B2 * | 1/2011 | Witkowski | ............. | G08C 19/28 340/12.24 |
| 8,565,675 B2 * | 10/2013 | Bangs | .................. | G06K 7/0008 330/252 |
| 8,600,830 B2 * | 12/2013 | Hoffberg | ............ | G06Q 30/0207 705/14.71 |

(Continued)

*Primary Examiner* — Hai V Nguyen
(74) *Attorney, Agent, or Firm* — Sterne, Kessler, Goldstein & Fox P.L.L.C.

(57) ABSTRACT

A first near field communication (NFC) device or a first NFC-enabled device utilizes a feedback based approach to allow for dynamic adjusting of one or more operating characteristics. The feedback based approach can be a direct feedback based approach or an indirect feedback based approach. In the direct feedback based approach, a second NFC device or a second NFC-enabled device can communicate information to the first NFC device or the first NFC-enabled device to cause the first NFC device or the first NFC-enabled device to dynamically adjust the one or more operating characteristics. In the indirect feedback based approach, the first NFC device or the first NFC-enabled device can dynamically adjust the one or more operating characteristics in response to the non-occurrence of an event, such as receiving a response command from the second NFC device or the second NFC-enabled device to provide an example.

15 Claims, 3 Drawing Sheets

(56) References Cited

U.S. PATENT DOCUMENTS

| | | | | |
|---|---|---|---|---|
| 8,655,273 B2* | 2/2014 | Huomo | H04B 5/0031 | 455/41.1 |
| 8,824,961 B2* | 9/2014 | Royston | G06K 7/10138 | 455/101 |
| 8,903,312 B2* | 12/2014 | Haverinen | H04B 5/0031 | 455/41.1 |
| 8,908,671 B2* | 12/2014 | Morita | G06K 7/10237 | 370/350 |
| 8,942,628 B2* | 1/2015 | Haverinen | H04B 5/02 | 455/41.1 |
| 9,130,601 B2* | 9/2015 | Huomo | H04B 5/0031 | |
| 9,189,724 B2* | 11/2015 | Morita | G06K 7/10237 | |
| 9,281,937 B2* | 3/2016 | Hoshida | H04L 7/0075 | |
| 9,311,670 B2* | 4/2016 | Hoffberg | G06Q 20/401 | |
| 9,350,831 B2* | 5/2016 | Trost | H04M 1/0202 | |
| 2003/0091196 A1* | 5/2003 | Spencer | G10K 15/02 | 381/58 |
| 2003/0091203 A1* | 5/2003 | Croft, III | G10K 15/02 | 381/111 |
| 2004/0203383 A1* | 10/2004 | Kelton | H04L 1/02 | 455/41.2 |
| 2005/0096881 A1* | 5/2005 | Watson | B60R 21/0136 | 702/190 |
| 2006/0214813 A1* | 9/2006 | Witkowski | G08C 19/28 | 340/12.22 |
| 2007/0118312 A1* | 5/2007 | Cech | B60R 21/0136 | 702/65 |
| 2007/0233407 A2* | 10/2007 | Cech | B60R 21/0136 | 702/65 |
| 2008/0224825 A1* | 9/2008 | Nystrom | G06K 7/0008 | 340/10.1 |
| 2008/0291043 A1* | 11/2008 | Duron | G06F 21/74 | 340/686.6 |
| 2010/0009627 A1* | 1/2010 | Huomo | H04B 5/0031 | 455/41.1 |
| 2010/0015917 A1* | 1/2010 | Symons | H04B 5/0075 | 455/41.1 |
| 2010/0068999 A1* | 3/2010 | Bangs | G06K 7/0008 | 455/41.1 |
| 2010/0235285 A1* | 9/2010 | Hoffberg | G06Q 20/401 | 705/75 |
| 2010/0264211 A1* | 10/2010 | Jain | G06F 1/1698 | 235/380 |
| 2010/0317420 A1* | 12/2010 | Hoffberg | G06Q 30/0207 | 463/1 |
| 2012/0083205 A1* | 4/2012 | Marcu | G06K 7/0008 | 455/41.1 |
| 2012/0329391 A1* | 12/2012 | Hall | H04B 5/0075 | 455/41.1 |
| 2013/0005242 A1* | 1/2013 | Royston | G06K 7/10138 | 455/41.1 |
| 2013/0052947 A1* | 2/2013 | Kole | H04B 5/0031 | 455/41.1 |
| 2013/0137370 A1* | 5/2013 | Haverinen | H04B 5/0031 | 455/41.1 |
| 2013/0137371 A1* | 5/2013 | Haverinen | H04B 5/02 | 455/41.1 |
| 2013/0201316 A1* | 8/2013 | Binder | H04L 67/12 | 348/77 |
| 2013/0295843 A1* | 11/2013 | Tian | H04B 5/00 | 455/41.1 |
| 2013/0344805 A1* | 12/2013 | Lefley | H04B 5/0031 | 455/41.1 |
| 2014/0162553 A1* | 6/2014 | Huomo | H04B 5/0031 | 455/41.1 |
| 2014/0187150 A1* | 7/2014 | McFarthing | H04B 5/0031 | 455/41.1 |
| 2014/0270804 A1* | 9/2014 | Hoshida | H04L 7/0075 | 398/154 |
| 2014/0282958 A1* | 9/2014 | Salonen | H04L 63/0861 | 726/7 |
| 2014/0304094 A1* | 10/2014 | Reddy | G02B 6/0073 | 705/17 |
| 2014/0358472 A1* | 12/2014 | Goel | A61B 5/1118 | 702/141 |
| 2014/0358473 A1* | 12/2014 | Goel | A61B 5/1118 | 702/141 |
| 2015/0072737 A1* | 3/2015 | Morita | G06K 7/10237 | 455/558 |
| 2015/0094065 A1* | 4/2015 | Su | H04W 36/30 | 455/436 |
| 2015/0118958 A1* | 4/2015 | Jain | G06Q 20/204 | 455/41.1 |
| 2015/0207616 A1* | 7/2015 | Choke | H04B 5/0031 | 455/41.1 |
| 2016/0020862 A1* | 1/2016 | Morshedi | H04B 17/12 | 455/77 |
| 2016/0028445 A1* | 1/2016 | Mofidi | H04B 5/0025 | 455/41.1 |
| 2016/0043775 A1* | 2/2016 | Ravani | G06K 19/0727 | 455/41.1 |
| 2016/0057137 A9* | 2/2016 | Salonen | H04L 63/0861 | 726/7 |
| 2016/0213314 A1* | 7/2016 | Zuckerman-Stark | A61B 5/7264 | |

* cited by examiner

FEEDBACK-BASED ADAPTIVE LOAD MODULATION (ALM) FOR A NEAR FIELD COMMUNICATION (NFC) DEVICE

CROSS-REFERENCE TO RELATED APPLICATIONS

The present application claims the benefit of U.S. Provisional Patent Application Ser. No. 62/047,527, filed Sep. 8, 2014, which is incorporated herein by reference in its entirety.

BACKGROUND

Field of Disclosure

The present disclosure generally relates to near field communication (NFC) devices, including dynamic adjusting of one or more operating characteristics of the NFC devices utilizing a feedback based approach.

Related Art

The continued improvement of semiconductor fabrication processes has allowed manufacturers and designers to create a smaller and a more powerful electronic device. This smaller and more powerful electronic device is being integrated with near field communication (NFC) technology to facilitate the use of the electronic device in conducting daily transactions. Often times, the smaller and more powerful electronic device is integrated with a NFC device to provide the NFC technology. For example, instead of carrying numerous credit cards, the credit information provided by these credit cards can be loaded and stored onto a first NFC device to be used as needed. The first NFC device is simply tapped to a second NFC device, such as a credit card terminal, to relay the credit information to the second NFC device to complete a transaction. As another example, a first NFC device, such as a ticket writing system, may simply write ticket fare information onto a second NFC device instead of providing a paper ticket to a passenger. The passenger simply taps the second NFC device to a third NFC device to ride the bus or the train without using a traditional the paper ticket.

An NFC device can operate in an active load modulation (ALM) mode of operation or in a passive load modulation (PLM) mode of operation. When operating in the ALM mode of operation, a first NFC device generates a first carrier wave and couples the carrier wave onto a second NFC device via a first magnetic field. Optionally, the first carrier wave can be modulated with information to communicate the information to the second NFC device. In contrast, the first NFC device does not generate the first carrier wave when operating in the PLM mode of operation. Rather, a second carrier wave is generated by the second NFC device, which operates in the ALM mode of operation. The second carrier wave couples onto the first NFC device via a second magnetic field generated by the second NFC device. The first NFC device can optionally modulate the second carrier wave with information to communicate the information to the second NFC device.

BRIEF DESCRIPTION OF THE DRAWINGS/FIGURES

Figure 1:
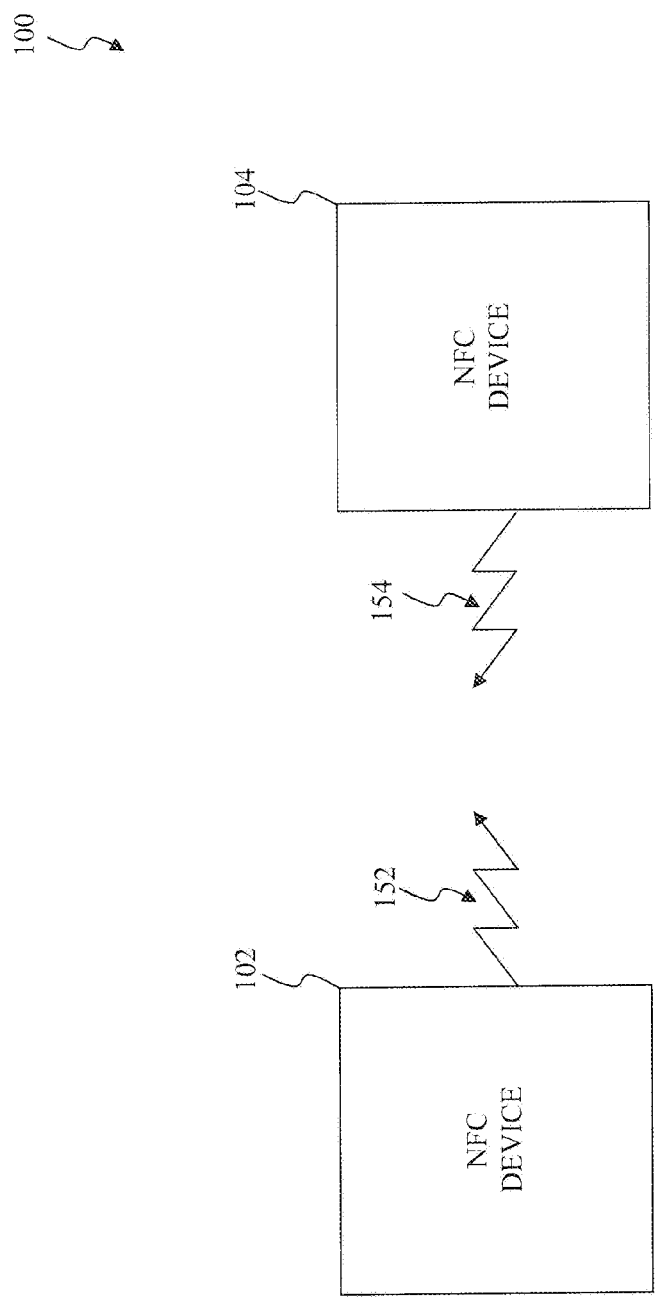
FIG. 1 illustrates a block diagram of a near field communication (NFC) environment according to an exemplary embodiment of the disclosure.

Embodiments of the disclosure are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE DISCLOSURE

Overview

A first near field communication (NFC) device or a first NFC-enabled device utilizes a feedback based approach to allow for dynamic adjusting of one or more operating characteristics. The feedback based approach can be a direct feedback based approach or an indirect feedback based approach. In the direct feedback based approach, a second NFC device or a second NFC-enabled device can communicate information to the first NFC device or the first NFC-enabled device to cause the first NFC device or the first NFC-enabled device to dynamically adjust the one or more operating characteristics. In the indirect feedback based approach, the first NFC device or the first NFC-enabled device can dynamically adjust the one or more operating characteristics in response to the non-occurrence of an event, such as receiving a response command from the second NFC device or the second NFC-enabled device to provide an example.

An Exemplary Near Field Communications (NFC) Environment

FIG. 1 illustrates a block diagram of an NFC environment according to an exemplary embodiment of the disclosure. An NFC environment 100 provides wireless communication of information, such as one or more commands and/or data, among a first NFC device 102 and a second NFC device 104 that are sufficiently proximate to each other.

The first NFC device 102 and the second NFC device 104 interact with each other to exchange information, such as one or more commands and/or data. As illustrated in FIG. 1, the first NFC device 102 and/or the second NFC device 104 can operate in an active load modulation (ALM) triode of operation or a passive load modulation (PLM) mode of operation. In the ALM mode of operation, the first NFC device 102 modulates its corresponding information onto a first carrier wave, referred to as a modulated information communication, and generates a first magnetic field by applying the modulated information communication to a first antenna to provide a first information communication 152. The first NFC device 102 is sufficiently proximate to the second NFC device 104 such that the first information communication 152 is inductively coupled onto a second antenna of the second NFC device 104.

The second NFC device 104 demodulates the first information communication 152 to recover the information. The second NFC device 104 may respond to the information by modulating its corresponding information onto a second carrier wave and generating a second magnetic field by applying this modulated information communication to the second antenna to provide a second modulated information communication 154 in the ALM mode of operation. Alternatively, the second NFC device 104 may respond to the information by modulating the second antenna with its corresponding information to modulate the first carrier wave to provide the second modulated information communication 154 in the PLM mode of operation.

The first NFC device 102 and/or the second NFC device 104 can dynamically adjust their corresponding one or more operating characteristics, such as modes of operation, phases of their corresponding carriers, amplitudes of their corresponding carriers, shapes of their corresponding carriers, and/or frame delay times to provide some examples, to reliably communicate their corresponding information. For example, the first NFC device 102 and the second NFC device 104 can both be configured to operate in the ALM mode of operation. In the ALM mode of operation, the first NFC device 102 and the second NFC device 104 can generate the first magnetic field and the second magnetic field, respectively, as discussed above. The intensities of the first magnetic field and the second magnetic field are related to a distance between the first NFC device 102 and the second NFC device 104. In some situations, the intensities of the first magnetic field and the second magnetic field can be sufficiently strong to saturate, or even permanently damage, the first NFC device 102 and/or the second NFC device 104. In these situations, the first NFC device 102 and/or the second NFC device 104 can dynamically adjust from the ALM mode of operation to the PLM mode of operation to prevent the first magnetic field and/or the second magnetic field from saturating, or permanently damaging, the first NFC device 102 and/or the second NFC device 104.

The first NFC device 102 and/or the second NFC device 104 can utilize a feedback based approach to allow for the dynamic adjusting of their corresponding one or more operating characteristics. The feedback based approach can be a direct feedback based approach or an indirect feedback based approach. In the direct feedback based approach, the first NFC device 102 can communicate information to the second NFC device 104 to cause the second NFC device 104 to dynamically adjust its corresponding one or more operating characteristics. Similarly, the second NFC device 104 can communicate information to the first NFC device 102 to cause the first NFC device 102 to dynamically adjust its corresponding one or more operating characteristics. In an exemplary embodiment, the first NFC device 102 and/or the second NFC device 104 can measure one or more signal metrics of the second magnetic field and the first magnetic field, respectively. The one or more signal metrics may include one or more mean voltage and/or current levels, one or more average voltage and/or current levels, one or more instantaneous voltage and/or current levels, one or more root mean square voltage and/or current levels, one or more mean powers, one or more average powers, one or more instantaneous powers, one or more root mean square powers, and/or any other suitable signal metric of the first magnetic field and/or of the second magnetic field which will be apparent to those skilled in the relevant art(s) without departing from the spirit and scope of the disclosure.

The first NFC device 102 and/or the second NFC device 104 can dynamically adjust their corresponding one or more operating characteristics by comparing the one or more signal metrics and one or more operating thresholds. In an exemplary embodiment, the first NFC device 102 and/or the second NFC device 104 can dynamically adjust from the ALM mode of operation to the PLM mode of operation when the one or more signal metrics are greater than the one or more operating thresholds or from the PLM mode of operation to the ALM mode of operation when the one or more signal metrics are less than the one or more operating thresholds. In this exemplary embodiment, when the one or more signal metrics are greater than the one or more operating thresholds, the first magnetic field and the second magnetic field can potentially saturate, or permanently damage, the second NFC device 104 and the first NFC device 102, respectively. As a result, the first NFC device 102 and/or the second NFC device 104 can dynamically adjust from the ALM mode of operation to the PLM mode of operation to reduce the intensities of the first magnetic field and of the second magnetic field, respectively. Otherwise, when the one or more signal metrics are less than the one or more operating thresholds, there is a minimal or reduced likelihood that the first magnetic field and the second magnetic field can potentially saturate, or permanently damage, the second NFC device 104 and the first NFC device 102, respectively. As a result, the first NFC device 102 and/or the second NFC device 104 can dynamically adjust from the PLM mode of operation to the ALM mode of operation to increase the intensities of the first magnetic field and of the second magnetic field, respectively.

In the indirect feedback based approach, the first NFC device 102 and/or the second NFC device 104 can dynamically adjust their corresponding one or more operating characteristics in response to the non-occurrence of an event. For example, often times when the first NFC device 102 and/or the second NFC device 104 communicate their corresponding information, the first NFC device 102 and/or the second NFC device 104 expect a response from the second NFC device 104 and/or the first NFC device 102, respectively. In this example, the first NFC device 102 and/or the second NFC device 104 assumes that their corresponding information was not received when the response was not received. In this situation, the first NFC device 102 and/or the second NFC device 104 can dynamically adjust their corresponding one or more operating characteristics and once again communicate their corresponding information.

An Exemplary Feedback Based Approach

Figure 2:
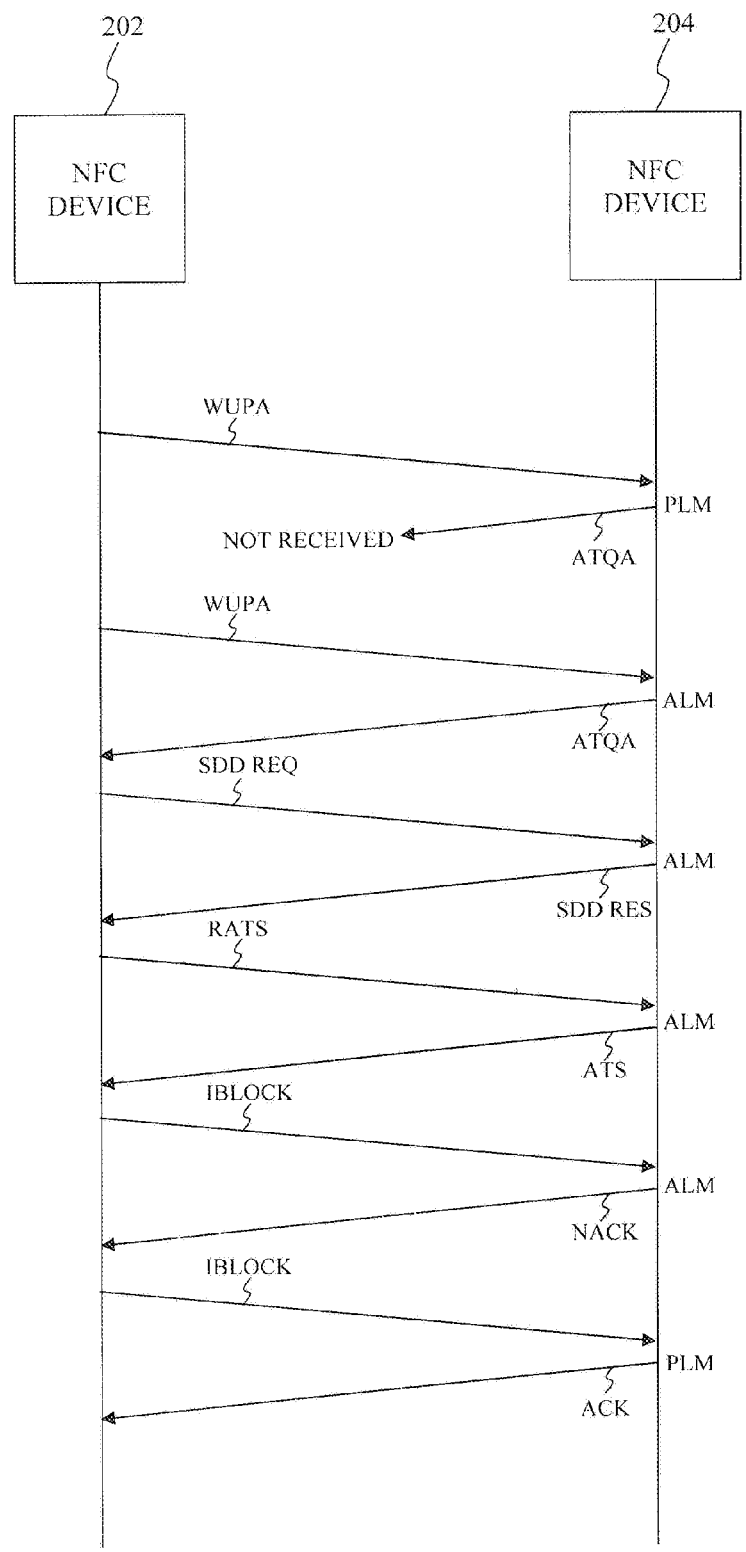
FIG. 2 illustrates a feedback based approach that can be used within the NFC environment according to an exemplary embodiment of the disclosure.

FIG. 2 illustrates a feedback based approach that can be used within the NFC environment according to an exemplary embodiment of the disclosure. FIG. 2 illustrates a situation when a first NFC device 202, such as the first NFC device 102 to provide an example, is moving toward a second NFC device 204, such as the second NFC device 104 to provide an example. In the exemplary embodiment illustrated in FIG. 2, the first NFC device 202 and the second NFC device 204 are implemented as a Type-A as defined in the International Organization for Standardization (ISO)/International Electrotechnical Commission (IEC) 14443. However, this example is not limiting. Those skilled in the relevant art(s) will recognize that the first NFC device 202 and the second NFC device 204 can be implemented in accordance with any suitable NFC standard or protocol with departing from the spirit and scope of the present disclosure.

As illustrated in FIG. 2, the first NFC device 202 communicates a query to the second NFC device 204 while operating in the ALM mode of operation. The query can be in the form of a standardized wake-up command, such as the WUPA command; however other standardized commands such as REQA, REQB, and/or WUPB can be used. In response, the second NFC device 204 sends an answer or a response typically in the form of a standardized response command, such as an ATQA command to provide an example, while operating in the PLM mode of operation.

In some situations, the ATQA command was not received by the first NFC device 202 and/or the first NFC device 202 cannot properly decode the ATQA command. Consequently, the first NFC device 202 sends a second query to the second NFC device 204, such as a second WUPA command to provide an example. Typically, the first NFC device 202 sends the second query to the second NFC device 204 after expiration of a timeout condition. Upon receipt of the second query, the second NFC device 204 recognizes that the first NFC device 202 did not receive or cannot properly decode the answer or the response. In this situation, the second NFC device 204 changes its mode of operation from the PLM mode of operation to the ALM mode of operation and once again sends the answer or the response while operating in the ALM mode of operation.

Next, after receipt of the answer or the response, the first NFC device 202 sends a detection command, such as a Single Device Detection (SDD) command, that is defined according to NFC Digital Protocol Technical Specification: NFC Forum: Digital 1.0 to provide an example, to select the second NFC device 204 from among multiple NFC devices that can be present within the environment. In response, the second NFC device 204 sends an answer or a response typically in the form of a SDD response (RES) command that is defined according to the NFC Digital Protocol Technical Specification: NFC Forum: Digital 1.0.

Thereafter, as illustrated in FIG. 2, the first NFC device 202 sends a command, such as a Request for Answer to Select (RATS) command to provide an example, to negotiate parameters, such as the maximum frame size and the bit rate divisors (D) to provide some examples, for communicating with the second NFC device 204. The second NFC device 204 communicates a response command, such as an Answer to Select (ATS) that is defined according to the NFC Digital Protocol Technical Specification: NFC Forum: Digital 1.0 while operating in the ALM mode of operation.

In response to decoding the ATS command, the first NFC device 202 communicates a block of data, shown as IBLOCK in FIG. 2, to the second NFC device 204. The second NFC device 204 communicates a response command, such as an Acknowledgement (ACK) message or a Negative-Acknowledgment (NACK) message, to the IBLOCK while operating in the ALM mode of operation. As illustrated in FIG. 2, the second NFC device 204 sends the NACK indicating that the IBLOCK was not received and/or the second NFC device 204 cannot properly decode the IBLOCK. Typically, the second NFC device 204 sends the NACK to the first NFC device 202 after expiration of a timeout condition. In response to the NACK message, the second NFC device 204 changes its mode of operation from the ALM mode of operation to the PLM mode of operation. In an exemplary embodiment, this situation can arise when the second NFC device 204 is moving closer to the first NFC device 202. When the distance between the first NFC device 202 and the second NFC device 204 is significantly reduced, transmitting in the ALM mode of operation can overwhelm the first NFC device 202 causing the first NFC device 202 to not properly decode communications from the second NFC device 204. In this instance, the second NFC device 204 can adjust to the PLM to reduce power of its communication to allow the first NFC device 202 to properly decode communications from the second NFC device 204 at a reduced power level.

Also in response to the NACK message, the first NFC device 202 once again communicates the IBLOCK to the second NFC device 204. In response, the second NFC device 204 sends an ACK message to the IBLOCK while operating in the PLM mode of operation indicating that the second NFC device 204 has received the IBLOCK and/or can properly decode the IBLOCK. Although not illustrated in FIG. 2, the communication between the first NFC devices 202 and second NFC device 204 continues until all data has been transferred from the first NFC device 202 to the second NFC device 204. During this communication, the second NFC device 204 dynamically adjusts between the ALM mode of operation and the PLM mode of operation when it receives multiple similar sequential communications from the first NFC device 202 or sends the NACK message to the first NFC device 202 in response to a communication from the first NFC device 202.

An Exemplary Near Field Communications (NFC) Device

Figure 3:
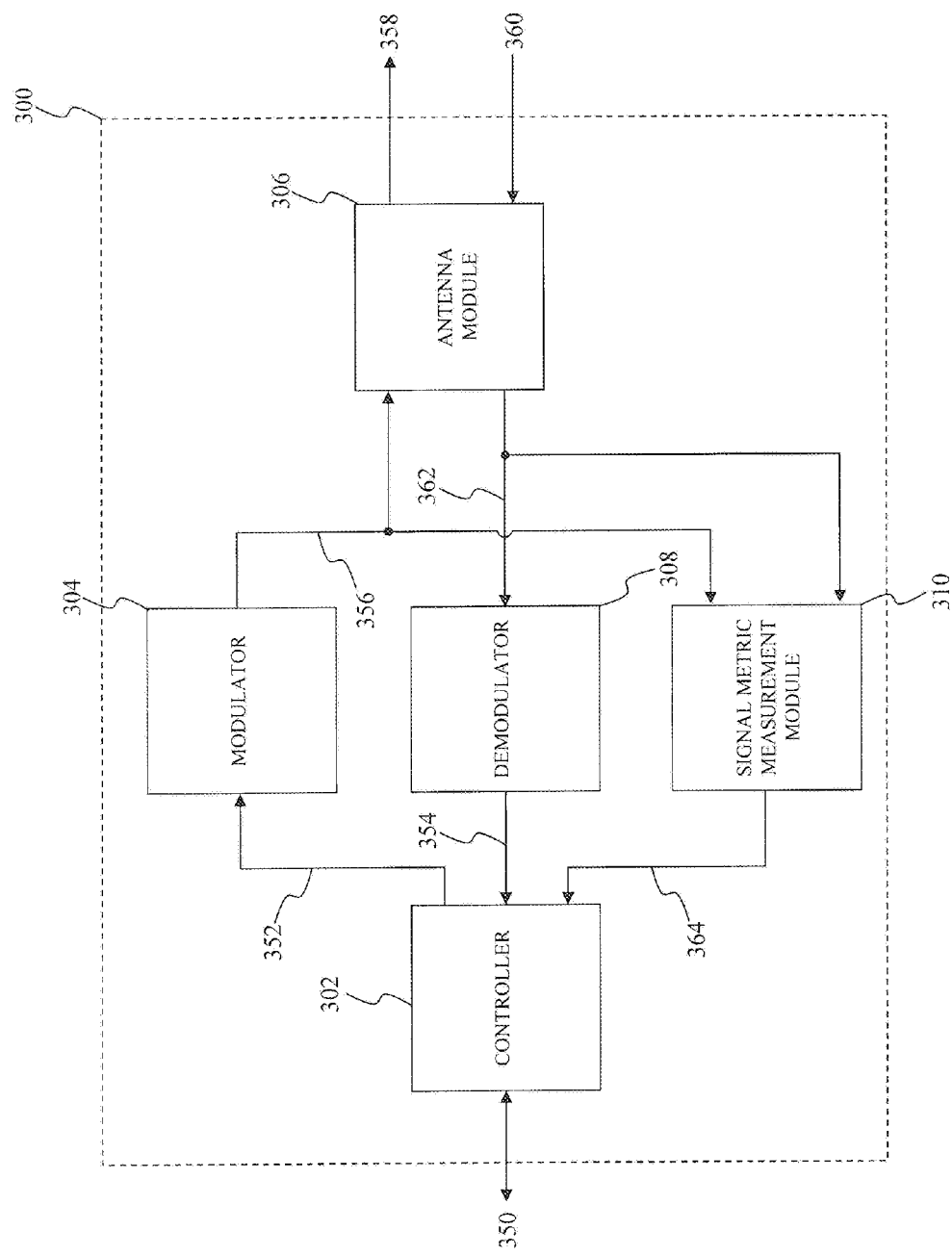
FIG. 3 illustrates a block diagram of an exemplary NFC device within the NFC environment according to an exemplary embodiment of the disclosure.

FIG. 3 illustrates a block diagram of an exemplary NFC device within the NFC environment according to an exemplary embodiment of the disclosure. An NFC device 300 may be implemented as a standalone or a discrete device or may be incorporated within or coupled to another electrical device or host device such as a mobile telephone, a portable computing device, another computing device such as a personal, a laptop, or a desktop computer, a computer peripheral such as a printer, a portable audio and/or video player, a payment system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the disclosure. When incorporated within or coupled to the other electrical device or host device, the NFC device 300 and the other electrical device or host device can be referred to as being an NFC-enabled device. As illustrated in FIG. 3, the NFC device 300 includes a controller module 302, a modulator 304, an antenna module 306, a demodulator 308, and an optional signal measurement module 310. The NFC device 300 can represent an exemplary embodiment of the first NFC device 102, the second NFC device 104, the first NFC device 202, and/or the second NFC device 204.

The controller module 302 controls the overall operation and/or configuration of the NFC device 300. The controller module 302 provides information 350 to and/or receives the information 350 from one or more data storage devices such as one or more contactless transponders, one or more contactless tags, one or more contactless smartcards, or any other machine-readable mediums that will be apparent to those skilled in the relevant art(s) without departing from the spirit and scope of the disclosure, or any combination thereof. The other machine-readable medium may include, but is not limited to, read only memory (ROM), random access memory (RAM), magnetic disk storage media, optical storage media, and/or flash memory devices to provide some examples. The controller module 302 may also provide the information 350 to and/or receive the information 350 from a user interface such as a touch-screen display, an alphanumeric keypad, a microphone, a mouse, a speaker, any other suitable user interface that will be apparent to those skilled in the relevant art(s) without departing from the spirit and scope of the disclosure to provide some examples. The controller module 302 may further provide the information 350 to and/or receive the information 350 from other electrical devices or host devices coupled to the NFC device 300. The controller module 302 can provide the information 350 as transmission information 352 for transmission to a second NFC device or a second NIT-enabled device. Additionally, the controller module 302 can provide recovered information 354 from the demodulator 308 as the information 350.

Further, the controller module 302 may use the information 350, the recovered information 354, and/or one or more signal metrics 364 to control the overall operation and/or configuration of the NFC device 300. The controller module 302 can dynamically adjust one or more operating characteristics, such as mode of operation, phase of carriers, amplitude of carriers, shapes of carriers, and/or frame delay time to provide some examples, of the NFC device 300 in response to the information 350, the recovered information 354, and/or the one or more signal metrics 364 utilizing a feedback based approach. As discussed above, the feedback based approach can be a direct feedback based approach or an indirect feedback based approach. In the direct feedback based approach, the controller module 302 can dynamically adjust the one or more operating characteristics in response to the information 350, the recovered information 354, and/or the one or more signal metrics 364. For example, the information 350 and/or the recovered information 354 can represent a response command, such as a Negative-Acknowledgment (NACK) message, that is received from the second NFC device or the second NFC-enabled device. In this example, the controller module 302 can dynamically adjust the one or more operating characteristics in response to receiving the response command. As another example, the controller module 302 can dynamically adjust the one or more operating characteristics by comparing the one or more signal metrics 364 and one or more operating thresholds. In an exemplary embodiment, the controller module 302 can dynamically adjust from the ALM mode of operation to the PLM mode of operation when the one or more signal metrics 364 are greater than one or more operating thresholds or from the PLM mode of operation to the ALM mode of operation when the one or more signal metrics 364 are less than the one or more operating thresholds.

In the indirect feedback based approach, the controller module 302 can dynamically adjust the one or more operating characteristics in response to the non-occurrence of an event. For example, often times when the NFC device 300 communicates the information 350 to the second NFC device or the second NFC-enabled device, the controller module 302 expects a response from the second NFC device or the second NFC-enabled device. After transmission of the information 350 to the second NFC device or the second NFC-enabled device, the controller module 302 activates a response timer. Upon expiration of the response timer, the controller module 302 assumes that the information 350 was not received when the response was not received. In this situation, the controller module 302 can dynamically adjust the one or more operating characteristics and can once again communicate the information 350 to the second NFC device or the second NFC-enabled device.

The modulator 304 modulates the transmission information 352 onto a carrier wave using any suitable analog or digital modulation technique to provide a transmission signal 356. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s). When operating in the ALM mode of operation, the modulator generates the carrier wave. Otherwise, the second NFC device or the second NFC-enabled device may inductively couple the carrier wave onto the antenna module 306 in the PLM mode of operation.

The antenna module 306 applies the transmission signal 356 to an inductive coupling element, such as a resonant tuned circuit to provide an example, to generate a magnetic field to provide a transmitted information communication 358. Additionally, the second NFC device or the second NFC-enabled device may inductively couple a received communication signal 360 onto the inductive coupling element to provide a recovered communication signal 362. For example, the second NFC device or the second NFC-enabled device may respond to the information by modulating its corresponding antenna with its corresponding information to modulate the carrier wave to provide the received communication signal 360. As another example, the second NFC device or the second NFC-enabled device may modulate its corresponding information onto its corresponding carrier wave and generate its corresponding magnetic field by applying this modulated information communication to its corresponding antenna to provide the received communication signal 360.

The demodulator 308 demodulates the recovered communication signal 362 using any suitable analog or digital modulation technique to provide the recovered information 354. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM), and/or any other suitable modulation technique that will be apparent to those skilled in the relevant art(s).

The optional signal metric measurement module 310 determines the one or more signal metrics 364 of the transmission signal 356 and/or the recovered communication signal 362. The one or more signal metrics 364 may include a mean voltage and/or current level, an average voltage and/or current level, an instantaneous voltage and/or current level, a root mean square voltage and/or current level, a mean power, an average power, an instantaneous power, a root mean square power, a frequency, a phase and/or any other suitable signal metric of the transmission signal 356 and/or the recovered communication signal 362 which will be apparent to those skilled in the relevant art(s) without departing from the spirit and scope of the disclosure.

CONCLUSION

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching, and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A near field communication (NFC) device, comprising:
   a modulator configured to modulate information onto a carrier wave; and
   a controller module configured to:
      activate a response timer upon transmission of the modulated information to a second NFC device, and
      cause the NFC device to dynamically adjust an operating characteristic of the NFC device when a response to the modulated information is not received from the second NFC device before expiration of the response timer.

2. The NFC device of claim 1, wherein the operating characteristic comprises:
   a mode of operation of the NFC device;
   a phase of the carrier wave;
   an amplitude of the carrier wave;
   a shape of the carrier wave; or
   a frame delay time.

3. The NFC device of claim 1, wherein the operating characteristic comprises:
   an active load modulation (ALM) mode of operation, or
   a passive load modulation (PLM) mode of operation.

4. The NFC device of claim 1, further comprising:
   an antenna module configured to apply the modulated information to an inductive coupling element to provide a magnetic field to transfer the information to the second NFC device.

5. The NFC device of claim 1, wherein the carrier wave is inductively received from the second NFC device.

6. The NFC device of claim 1, wherein the modulator is configured to generate the carrier wave.

7. The NFC device of claim 1, wherein the NFC device is coupled to an electrical device or a host device to form an NFC-enabled device.

8. The NFC device of claim 1, wherein the operating characteristic is not adjusted when the response is received from the second NFC device before expiration of the response timer.

9. A near field communication (NFC) device, comprising:
   a demodulator configured to recover a first command from a first communication signal inductively received from a second NFC device and a second command from a second communication signal inductively received from the second device; and
   a controller module configured to adjust an operating characteristic of the NFC device when the first command is the same as the second command.

10. The NFC device of claim 9, wherein the operating characteristic comprises:
    a mode of operation of the NFC device;
    a phase of a carrier wave;
    an amplitude of the carrier wave;
    a shape of the carrier wave; or
    a frame delay time.

11. The NFC device of claim 9, wherein the operating characteristic comprises:
    an active load modulation (ALM) mode of operation, or
    a passive load modulation (PLM) mode of operation.

12. The NFC device of claim 9, further comprising:
    an antenna module configured to inductively receive the first communication signal and the second communication signal.

13. The NFC device of claim 9, wherein the NFC device is coupled to an electrical device or a host device to form an NFC-enabled device.

14. The NFC device of claim 9, wherein the first command and the second command comprise:
    a command from the second NFC device to wake-up.

15. The NFC device of claim 9, wherein the operating characteristic is not adjusted when the first command differs from the second command.

* * * * *